United States Patent Office 3,809,687
Patented May 7, 1974

3,809,687
HYDROGENATION OF POLYSTYRENE
Birt Allison, Jr., Calvin L. Daniels, and James H. Moss, Jr., Big Spring, Tex., assignors to Cosden Oil & Chemical Company, Big Spring, Tex.
No Drawing. Filed Dec. 20, 1971, Ser. No. 210,146
Int. Cl. C08f 27/24
U.S. Cl. 260—93.5 A    8 Claims

ABSTRACT OF THE DISCLOSURE

A process for the hydrogenation of ethylenically unsaturated aromatic polymeric compositions, which process comprises introducing said polymeric compositions dispersed in a suitable solvent therefor concurrently with hydrogen into a contact with a noble metal containing catalyst at a temperature of 100 to 350° C. and at an LHSV of 0.1 to 10.

BACKGROUND OF THE INVENTION

The present invention relates to a hydrogenation process. More particularly, the present invention relates to the hydrogenation of ethylenically unsaturated polymeric compositions.

For many uses of aromatic polymers such as polystyrene, particularly those of lower molecular weight, it is desirable that the polymer be saturated. However, aromatic polymers contain ethylenic unsaturation both in the aromatic nuclei of the polymer and in the carbon chains connecting such aromatic nuclei. Therefore, in order to obtain a saturated polymer, it becomes necessary to saturate the ethylenic unsaturation by hydrogenation. However, it has been found quite difficult to obtain a completely saturated aromatic polymer by hydrogenation because of the difficulty of obtaining hydrogenation of the ethylenic unsaturation of the aromatic nuclei.

It is now an object of the present invention to provide a new and improved hydrogenation process.

An additional object of the present invention is to provide a new and improved process for the hydrogenation of ethylenically unsaturated polymeric compositions.

Still another object of the present invention is to provide a new and improved process for the hydrogenation of polystyrene.

A remaining object of the present invention is to provide a new and improved process for the hydrogenation of ethylenically unsaturated aromatic hydrocarbon polymers whereby substantially complete hydrogenation of said polymer is obtained.

Additional objects will become apparent from the following description of the invention herein disclosed.

SUMMARY OF THE INVENTION

The present invention, which fulfills these and other objects, is a process for the hydrogenation of ethylenically unsaturated aromatic polymeric compositions, which process comprises introducing said polymeric compositions dispersed in a suitable solvent therefor concurrently with hydrogen into contact with a noble metal containing catalyst at a temperature of 100 to 350° C. and at an LHSV of 0.1 to 10.

By means of the present invention, the aromatic nuclei of the aromatic polymeric compositions are readily hydrogenated. Such hydrogenation is carried out with no undesirable side reactions.

DESCRIPTION OF THE PREFERRED EMBODIMENTS OF THE PRESENT INVENTION

The present invention may be applied to the hydrogenation of virtually any ethylenically unsaturated polymeric composition. However, it finds its most useful application in the hydrogenation of those ethylenically unsaturated polymers which are derived from vinyl aromatic monomers such as styrene, vinyl toluene, alpha methyl styrene, vinyl naphthalene and the like. In such polymers, the ethylenic unsaturation occurs in both the aromatic nuclei and in the connecting carbon chains of the polymers. The preferred use of the process of the present invention is in the hydrogenation of polystyrene compositions for the purpose of completely hydrogenating the polymer including the aromatic nuclei. While the present invention may be utilized to hydrogenate virtually any molecular weight of polymer, for example 500 to 100,000 molecular weight and higher, it finds its most advantageous use in the hydrogenation of those polymers having a molecular weight within the range of 500 to 10,000.

In order to effectively carry out the process of the present invention, the polymer to be hydrogenated is substantially dissolved in a solvent therefor. In one embodiment of the present invention, this solvent is an inert, saturated hydrocarbon. Among such solvents are the paraffinic hydrocarbons and the naphthenic hydrocarbons. Particularly useful are such saturated hydrocarbons of five to fifteen carbon atoms, preferably five to ten carbon atoms. Within this group are such compounds as cyclohexane, methylcyclohexane, ethylcyclohexane, dimethylcyclohexane, heptane, cycloheptane, cyclooctane, octane, methylheptanes, hexane, cyclopentane, pentane, methylpentanes, and the like. When using the present invention in its most useful application of hydrogenating polystyrene, it is preferred that the inert saturated solvent be cyclohexane, methylcyclohexane or cycloheptane. The amount of solvent employed will range from just enough to absorb and dissolve the polymer to as large an amount as desired. Generally, however, the amount of solvent employed is such as to provide a solution containing 1 to 30% by weight of the polymer within the solution.

In another embodiment of the present invention, the solvent for the polymer may be an unsaturated hydrocarbon such as an aromatic hydrocarbon which it is desired to hydrogenate. For example, the solvent may be benzene, toluene or the like. In such instance, the aromatic hydrocarbon is hydrogenated concurrently with the polymer. The resulting product of the hydrogenation of the aromatic hydrocarbon will be naphthenic and still a good solvent for the polymer. If this embodiment of the present invention is practiced, it will be necessary, of course, to increase the hydrogen concentration in order to hydrogenate both the aromatic solvent and the polymer.

The hydrogenation process of the present invention is carried out in the presence of a catalyst comprising a noble metal deposited on a suitable support. The noble metals include platinum, palladium, rhodium, osmium, iridium and ruthenium. In the preferred practice of the preferred invention, however, the noble metal employed is platinum, palladium, or rhodium with platinum and rhodium being preferred. The support for the noble metal most often is an alumina, silica-alumina, or silica support though other common support materials such as the oxides of calcium, magnesium, zirconium and the like may be employed. The preferred support for the catalyst of the present invention is alumina. Preferably, the support is one having a pore volume of greater than 0.3 and a surface area of greater than 100 square meters per gram. The noble metal most often is employed in an amount of 0.1 to 5.0% by weight of the total catalyst, preferably 0.3 to 1.0% by weight of the catalyst.

In carrying out the process of the present invention, the polymer-solvent mixture is passed into contact with the catalyst at a temperature of 100 to 350° C., preferably 150 to 275° C. The liquid hourly space velocity (LHSV) usually is within the range of 0.1 to 10, preferably 0.5 to 4.0. Pressures of 50 to 5000 p.s.i.g. and higher may be employed with 300 to 1000 p.s.i.g. being preferred.

The amount of hydrogen employed in carrying out the process of the present invention generally will range from 1 to 30 mols of hydrogen per mol of polymer. However, it is preferred to employ about 5 to 20 mols of hydrogen per mol of polymer. If the polymer solvent is itself unsaturated and is to be hydrogenated concurrently with the polymer, then the concentration of hydrogen should be increased accordingly and the LHSV normally is reduced somewhat.

After completion of the hydrogenation reaction, the hydrogenated polymer may be recovered from the hydrogenation effluent by any conventional means. Generally, the effluent is heated to volatilize the solvent from admixture with the hydrogenated polymer. The solvent may be recycled to dissolve additional polymer for passage through the hydrogenation reaction.

In order to further describe and to specifically illustrate the process of the present invention, the following examples are presented.

Example 1

A polystyrene having a molecular weight of approximately 1000 was dissolved in cyclohexane. The amount of polystyrene dissolved in the cyclohexane was sufficient to result in a 5% by weight polystyrene concentration in the mixture. The polystyrene-cyclohexane mixture was passed concurrently with hydrogen into contact with a catalyst consisting of 0.5% by weight platinum deposited on an alumina support. The alumina support was one having an average pore diameter of 0.48 cm.$^3$/gm. and a surface of 350 square meters per gram. The molar ratio of hydrogen to polystyrene was 15. The temperature and pressure conditions under which the polystyrene-cyclohexane mixture were passed over the catalyst were 400° F. and 650 p.s.i.g., respectively. The LHSV of the polystyrene-cyclohexane mixture was 0.75.

The effluent from the hydrogenation reaction was collected and the cyclohexane flashed from admixture with the polystyrene. The molecular weight of the polystyrene was found to be 1165 and from analysis by infrared spectrometry, it was determined that the polystyrene was completely saturated.

Example 2

To a reactor was charged 100 ml. of a catalyst consisting of 0.5% by weight rhodium deposited on an alumina support. The alumina support was one having average pore diameters of 0.51 cm.$^3$/gm. and a surface area of 350 square meters per gram. A mixture containing 10% by weight of a polystyrene having an average molecular weight of 1134 dissolved in cyclohexane was passed over the catalyst at a temperature of 365° F., a pressure of 510 p.s.i.g. and an LHSV of 2.26. Hydrogen was introduced concurrently with the feed mixture in a ratio of 16 mols of hydrogen per mol of polystyrene. After flashing the cyclohexane from the polystyrene, the resulting hydrogenated polystyrene was found to be completely hydrogenated and to have an average molecular weight of 1160.

Example 3

Example 2 was substantially repeated with the exception that the feed mixture of polystyrene and cyclohexane contained 15% by weight polystyrene and the temperature was 400° F., the LHSV 1.37, the pressure 600 p.s.i.g. and 12 mols of hydrogen per mol of polystyrene was used. Again, the hydrogenated polystyrene was found to be completely hydrogenated and to have an average molecular weight of approximately 1160.

What is claimed is:

1. A process for the hydrogenation of polystyrene which process comprises introducing said polystyrene dispersed in an inert saturated hydrocarbon selected from the group consisting of paraffinic hydrocarbons and naphthenic hydrocarbons, concurrently with 1 to 30 mols of hydrogen per mol of polystyrene, into contact with a catalyst comprising 0.1 to 5.0% by weight of a noble metal selected from the group consisting of platinum, palladium and rhodium, deposited on a support, at a temperature of 100 to 350° C., a pressure of 300 to 1000 p.s.i.g. and at an LHSV of 0.1 to 10.

2. The process of claim 1 wherein said polystyrene is one having a molecular weight of 500 to 10,000.

3. The process of claim 1 wherein said hydrocarbons contain 5 to 15 carbon atoms.

4. The process of claim 1 wherein said support is alumina.

5. The process of claim 1 wherein said noble metal is rhodium.

6. The process of claim 1 wherein said noble metal is platinum.

7. The process of claim 1 wherein said solvent is cyclohexane.

8. The process of claim 1 wherein the amount of aromatic polymer in the solution of polymer and solvent is within the range of 1 to 30% by weight.

References Cited

UNITED STATES PATENTS

| | | | |
|---|---|---|---|
| 2,093,096 | 9/1937 | Pier et al. | 260—93.5 |
| 3,484,421 | 12/1969 | Pine et al. | 260—93.5 |
| 3,607,989 | 9/1971 | Sonnabend | 260—93.5 |

JAMES A. SEIDLECK, Primary Examiner

U.S. Cl. X.R.

260—96 HY